US007161637B2

(12) United States Patent
Strickland et al.

(10) Patent No.: US 7,161,637 B2
(45) Date of Patent: *Jan. 9, 2007

(54) PROGRAM RESTART AND COMMERCIAL ENDING NOTIFICATION METHOD AND SYSTEM

(75) Inventors: Normi Strickland, Snellville, GA (US); Vernon Meadows, Lilburn, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/300,977

(22) Filed: Dec. 15, 2005

(65) Prior Publication Data

US 2006/0092335 A1   May 4, 2006

Related U.S. Application Data

(63) Continuation of application No. 09/998,148, filed on Nov. 30, 2001, now Pat. No. 7,012,653.

(51) Int. Cl.
*H04N 5/50* (2006.01)
(52) U.S. Cl. ................... 348/731; 348/738; 348/553; 348/908
(58) Field of Classification Search ............. 348/553, 348/700, 731, 732, 569, 738; 358/908; 725/18, 725/22, 32; 386/52
See application file for complete search history.

(56) References Cited

U.S. PATENT DOCUMENTS

| 4,697,209 | A | * | 9/1987 | Kiewit et al. ............. 725/19 |
| 4,750,213 | A | * | 6/1988 | Novak ..................... 455/3.01 |
| 4,752,834 | A | * | 6/1988 | Koombes ................... 386/59 |
| 4,782,401 | A | * | 11/1988 | Faerber et al. ............. 386/63 |
| 4,918,531 | A |  | 4/1990 | Johnson .................. 358/183 |
| 4,979,047 | A |  | 12/1990 | Wine ...................... 358/335 |
| 5,343,251 | A | * | 8/1994 | Nafeh ..................... 348/571 |
| 5,504,518 | A | * | 4/1996 | Ellis et al. ................ 725/22 |
| 5,640,320 | A | * | 6/1997 | Jackson et al. ............ 700/87 |
| 5,668,917 | A |  | 9/1997 | Lewine .................... 386/52 |
| 5,973,723 | A |  | 10/1999 | DeLuca ..................... 348/9 |
| 5,999,689 | A |  | 12/1999 | Iggulden .................. 386/46 |
| 6,002,831 | A |  | 12/1999 | Tada et al. ................ 386/46 |
| 6,172,712 | B1 |  | 1/2001 | Beard .................... 348/552 |
| 6,353,444 | B1 | * | 3/2002 | Katta et al. .............. 715/716 |
| 6,762,797 | B1 | * | 7/2004 | Pelletier ................. 348/559 |

* cited by examiner

*Primary Examiner*—Victor R. Kostak
(74) *Attorney, Agent, or Firm*—Merchant & Gould

(57) ABSTRACT

A method and system are provided for allowing channel surfing during the presentation of a commercial broadcast by returning the viewer to the desired program channel after the commercial broadcast has concluded. When a commercial broadcast is received that interrupts the presentation of a viewer's desired programming, channel surfing is facilitated based on increased audio volume levels broadcast with the commercial broadcast. During channel surfing, the present audio level of the primary channel presenting the undesired commercial broadcast is monitored. If the audio volume level drops below the level of the commercial broadcast or returns to the level set by the viewer for the desired program prior to receipt of the commercial broadcast, the desired program channel may be reselected to return the viewer to her desired program channel. The viewer may be notified that the commercial broadcast has ended prior to reselection of the desired program channel. Notification may be in the form of a notification message displayed to the viewer.

25 Claims, 3 Drawing Sheets

PROGRAM RESTART AND COMMERCIAL ENDING NOTIFICATION METHOD AND SYSTEM

This application is a continuation of co-pending U.S. application Ser. No. 09/998,148 entitled "Program restart and Commercial Ending Notification Method and System" filed Nov. 30, 2001, now U.S. Pat. No. 7,012,653, which is incorporated herein by reference.

FIELD OF THE INVENTION

This invention generally relates to methods and systems for controlling user-end television programming presentation.

BACKGROUND OF THE INVENTION

Televised programming presented on millions of televisions throughout the world is most often made possible from the proceeds derived from televised commercial broadcasting. For example, after a number of minutes of a given televised program, a variety of commercial broadcasts advertising everything from improved soap to automobiles are presented to the television viewer on behalf of the purchaser of the advertising time. Often, viewers do not wish to watch the commercial broadcasts, and sometimes, viewers even find certain commercial broadcasts annoying or offensive in some way. To avoid such commercial broadcasts, some television viewers temporarily stop viewing their televisions while they run a quick errand or obtain a snack. Other viewers, however, enjoy quickly selecting other channels for a very short viewing of the programming provided on other television channels during the period of the commercial broadcast. This process often called "channel surfing" allows the viewer to sample other programming offerings while avoiding an unwanted or undesirable commercial broadcast on the desired channel. However, a problem occurs when the viewer is surfing other channels for a period exceeding the commercial broadcast period, and consequently, the viewer misses a portion of the programming on the viewer's desired channel after the commercial broadcast has ended.

Prior methods have described skipping a commercial broadcast during some estimated fixed time interval. Other methods have eliminated commercial broadcasts by comparing present commercial broadcasts with memorized clips of the same commercial broadcast shown at a previous time. Still other methods have used the repetitive nature of commercial broadcasts to capture information about those broadcasts in order to eliminate those same commercials during subsequent showings. However, commercial broadcasts may vary in length causing difficulty with time-based methods. And, methods that rely on memorized clips or programming sequences from previously played commercials fail to detect or eliminate new commercials.

Additionally, an often undesirable aspect of commercial broadcasts is a noticeable increase in the audio volume level of the commercial broadcast as compared to the volume set by the viewer for the regular programming. Commercial broadcasters often cause the audio volume to be presented to users at a higher volume as compared to regular programming as a way of bringing commercial broadcasts to the attention of the user. It is known to have so called "smart audio" systems that detect changes in the audio volume level and that cause the volume to be maintained at the same level as the audio volume level set by the user for regular programming.

It is with respect to these considerations and others that the present invention has been made.

SUMMARY OF THE INVENTION

In accordance with the present invention, the above and other problems are solved by a method and system for allowing channel surfing during the presentation of a commercial broadcast by returning the viewer to the desired program channel after the commercial broadcast has concluded. When a commercial broadcast is received that interrupts the presentation of a viewer's desired programming, channel surfing is facilitated based on increased audio volume levels broadcast with the commercial broadcast. During channel surfing, the present audio level of the primary channel presenting the undesired commercial broadcast is monitored. If the audio volume level drops below the level of the commercial broadcast or returns to the level set by the viewer for the desired program channel prior to receipt of the commercial broadcast, the desired program channel may be reselected to return the viewer to her desired program channel.

According to another aspect, the viewer may be notified that the commercial broadcast has ended prior to reselection of the desired program channel. Notification may be in the form of a notification message displayed to the viewer.

These and other features and advantages, which characterize the present invention, will be apparent from a reading of the following detailed description and a review of the associated drawings. It is to be understood that both foregoing general description and the following detailed description are exemplary and explanatory only and are not restrictive of the invention, as claimed.

DETAILED DESCRIPTION OF THE INVENTION

The following description of an exemplary embodiment of the present invention is made with reference to the above-described drawings wherein like numerals refer to like parts or components throughout the several figures. The present invention is directed toward a method and system for facilitating "channel surfing" during the period of a commercial broadcast without missing portions of a desired program during the channel surfing.

Figure 1:
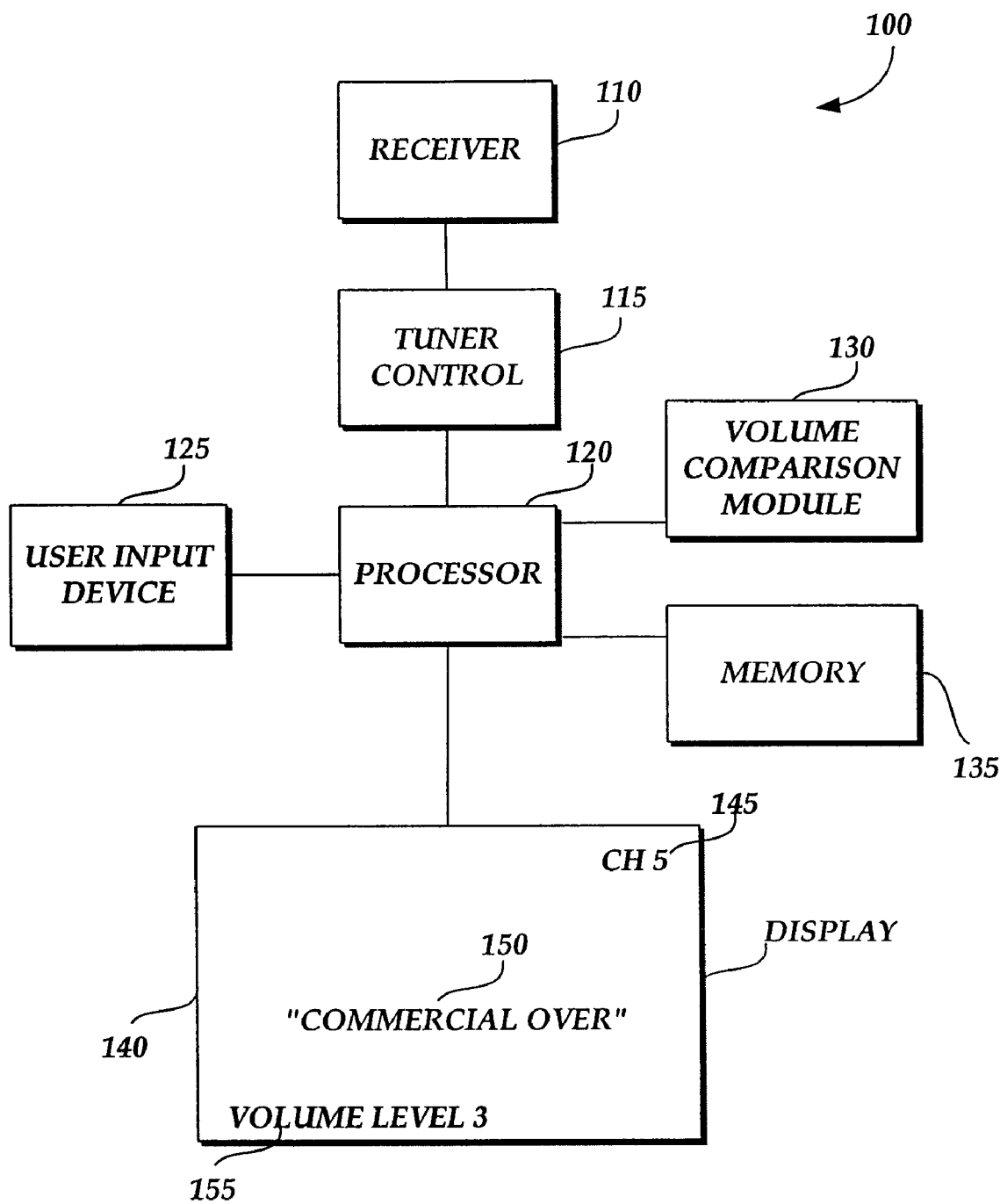
FIG. 1 is a block diagram representing a television system providing one embodiment of a system architecture for the present invention.

A television system 100 is illustrated in FIG. 1 that provides one embodiment of a system architecture for the present invention. The television program receiver 110 receives television programs broadcast from a variety of sources for presentation to a television viewer on the television display 140. As is understood by those skilled in the art, the receiver may include or be in the form of a variety of receiver devices including an antenna, a satellite transmission receiver dish, or a cable connected to a cable network system. The receiver 110 may also include multi-tuner capability for allowing so called picture-in-picture functionality where two programs are shown simultaneously in two pictures displayed simultaneously on the display 140.

The tuner control 115 causes the television system 100 to selectively receive, tune, and present various broadcast programs received via the receiver 110. For example, the tuner control 115 accounts for selective tuning between different broadcasts received simultaneously by the receiver 110.

The processor 120 is a multi-purpose computing device for controlling the presentation of broadcast programming, for receiving and utilizing user input, and for enabling the methods and system of the present invention described below. The user input device 125 includes means for receiving user input to the television system 100. For example, the user input device may include an infrared receiver for receiving signals from a user-controlled remote control unit. The user input device may include buttons and knobs for user selection of channels, audio volume levels, and other functionality provided by the television system 100, and the user input device may include other input capabilities, such as voice activated channel and volume selection.

The volume comparison module 130 is a software program module operated by the processor 120 in accordance with an exemplary embodiment of the present invention. The volume comparison module 130 detects, stores, and compares various audio volume levels set for different television channels or specific programs received via the receiver 110. Audio volume levels stored by the volume comparison module 130 are stored in memory 135. The memory 135 may be either volatile or non-volatile type memory as is understood by those skilled in the art. It should be understood, that the volume comparison module 130 may compare different audio volume levels on an analog basis by comparing different voltage settings corresponding to different audio volume levels. Preferably, however, the processor 120 includes at least one digital signal processor (DSP) for digitizing different audio volume levels so that audio volume levels may be compared by the volume comparison module 130 in digitized form.

In accordance with an exemplary embodiment of the present invention, the volume comparison module 130 stores the audio volume level of a particular program as set by the television user/viewer. When a commercial broadcast is received presenting a higher audio volume, the volume comparison module detects and stores the higher volume level for comparison against the audio volume level set by the user for the desired program. During channel surfing, the volume comparison module monitors the volume of the primary channel from which the viewer is surfing as an indication of the duration of the commercial broadcast. When the audio volume level for the first or primary channel on which the commercial broadcast is presented returns to the level set by the viewer for the desired program, the volume comparison module via the processor 120 terminates channel surfing and returns the viewer to the desired channel. Alternatively, the processor 120 causes a notification message 150 to be displayed to the user via the display 140 to notify the user that the commercial broadcast has ended.

The display 140 is any suitable television display screen for presentation of broadcast television programming and for display of user-end data such as the channel designation 145, the volume level designation 155 and the commercial termination notification 150 of the present invention.

The television system 100 described with respect to FIG. 1 is illustrative of a modern television with an integrated processor 120 and multi-input receiver 110. For operation of the present invention with older or less equipped televisions, the processor 120, the volume comparison module 130, the memory 135, and a user input device 125 may be integrated into a set-top box for providing the functionality of the present invention. As is well known to those skilled in the art, such a set-top box may be operated between the receiver 110 and the tuner control 115 of the television system 100.

Figure 2:
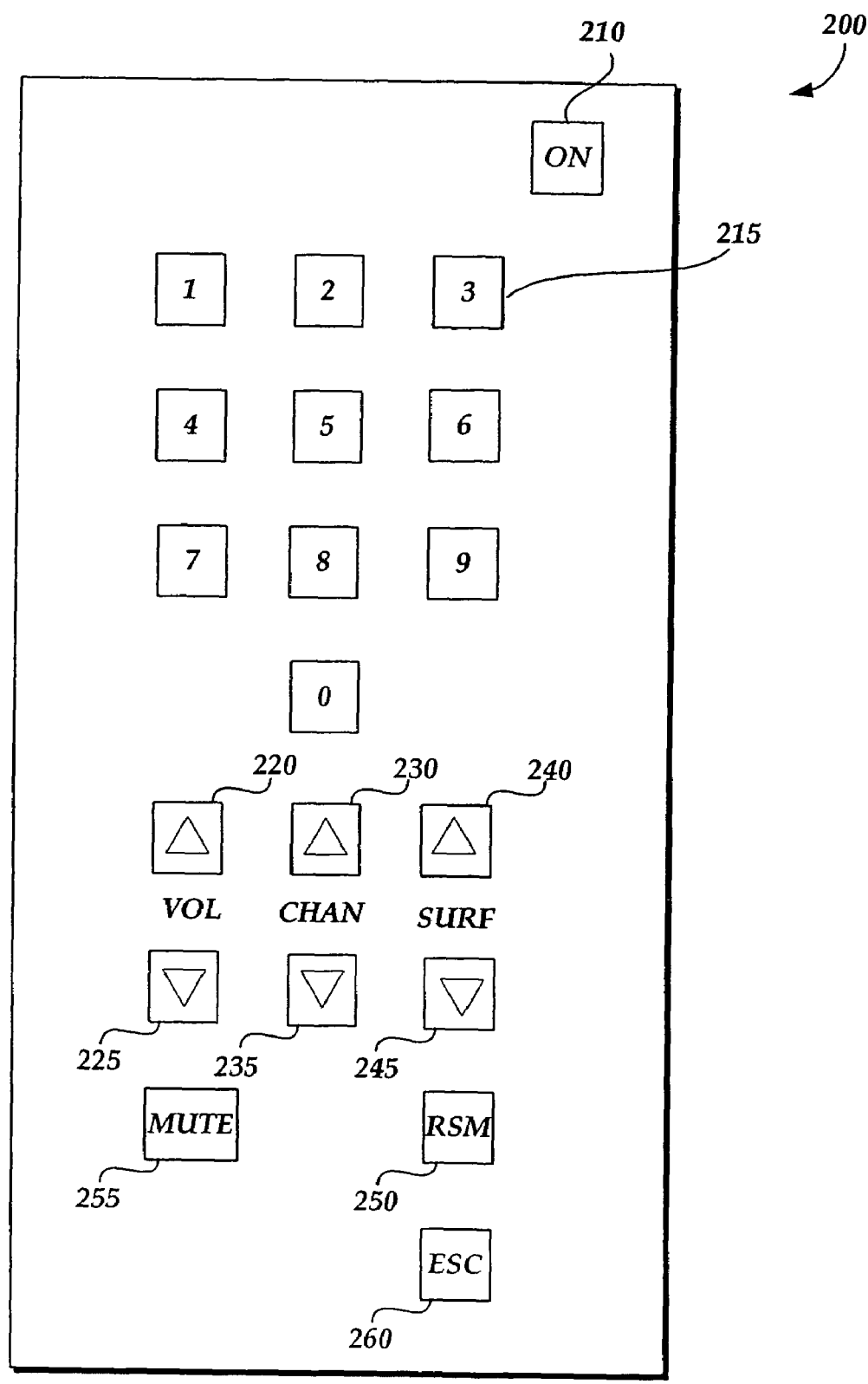
FIG. 2 illustrates a remote control unit for use in accordance with an exemplary embodiment of the present invention.

Referring now to FIG. 2, a television remote control unit according to an embodiment of the present invention is illustrated. The remote control unit 200 includes a variety of buttons for receiving input from the user of the television system 100. The ON button 210 turns the television system 100 to the on position, the numeral buttons 215 allow for numerical input, such as channel selection, the Volume Up and Down buttons 220, 225 allow for volume control. The Channel Up and Down buttons 230, 235 allow for channel control, and the Mute button 225 allows for muting the audio presentation.

In accordance with the present invention, a Surf Up button 240 and a Surf Down button 245 are also provided. When the viewer of the television 100 receives an unwanted commercial broadcast, the viewer may begin the channel surfing functionality of the present invention by selecting the Surf Up or Surf Down button 240, 245. Selection of the Surf Up button 240, for example, causes the volume comparison module 130 through the processor 120 to read and store the audio volume level of the present television channel on which the unwanted commercial is broadcast. Selection of the Surf button 240 also causes the next higher television channel to be presented to the user along with programming carried on that channel. Likewise, selection of the Surf Down button 245 begins the volume comparison process and causes the next lower channel to be provided to the viewer. As illustrated in FIG. 2, an Escape button 260 is provided for terminating the channel surfing functionality once the viewer is notified that the desired programming has returned to the desired channel and that the commercial broadcast is over. Accordingly, selection of the Escape button reselects the original channel and television program being viewed by the viewer prior to the commencement of channel surfing.

A Resume button 250 is illustrated for resuming channel surfing if desired. If the viewer is notified that the commercial broadcast is over, and the viewer returns to her desired channel, the viewer may find that some other undesirable broadcast immediately begins. Selection of the Resume button 250 will resume channel surfing at the channel last viewed by the viewer prior to returning to the viewer's original channel. Accordingly, the user is not required to surf through a number of channels the viewer had sampled prior to returning back to the original channel. It should be understood, that the functionality of the Surf buttons 240, 245, the Resume button 250, and the Escape button 260 may be integrated with the Channel Up and Down buttons 230, 235. That is, according to an alternative embodiment, selection of the Channel Up or Channel Down buttons 230, 235 may automatically begin the channel surfing functionality and volume comparison of the present invention. After the user is notified that the commercial broadcast has ended, the user may simply return to the desired channel in the conventional fashion, such as selecting the desired channel using the numerical buttons 215 or moving to the desired channel using the Channel Up or Down buttons 230, 235. Additionally, as described above, according to one embodiment of the present invention, the processor 120 may be programmed to automatically reselect the originally viewed channel upon the termination of the unwanted commercial broadcast.

Operation of an Exemplary Embodiment

Figure 3:
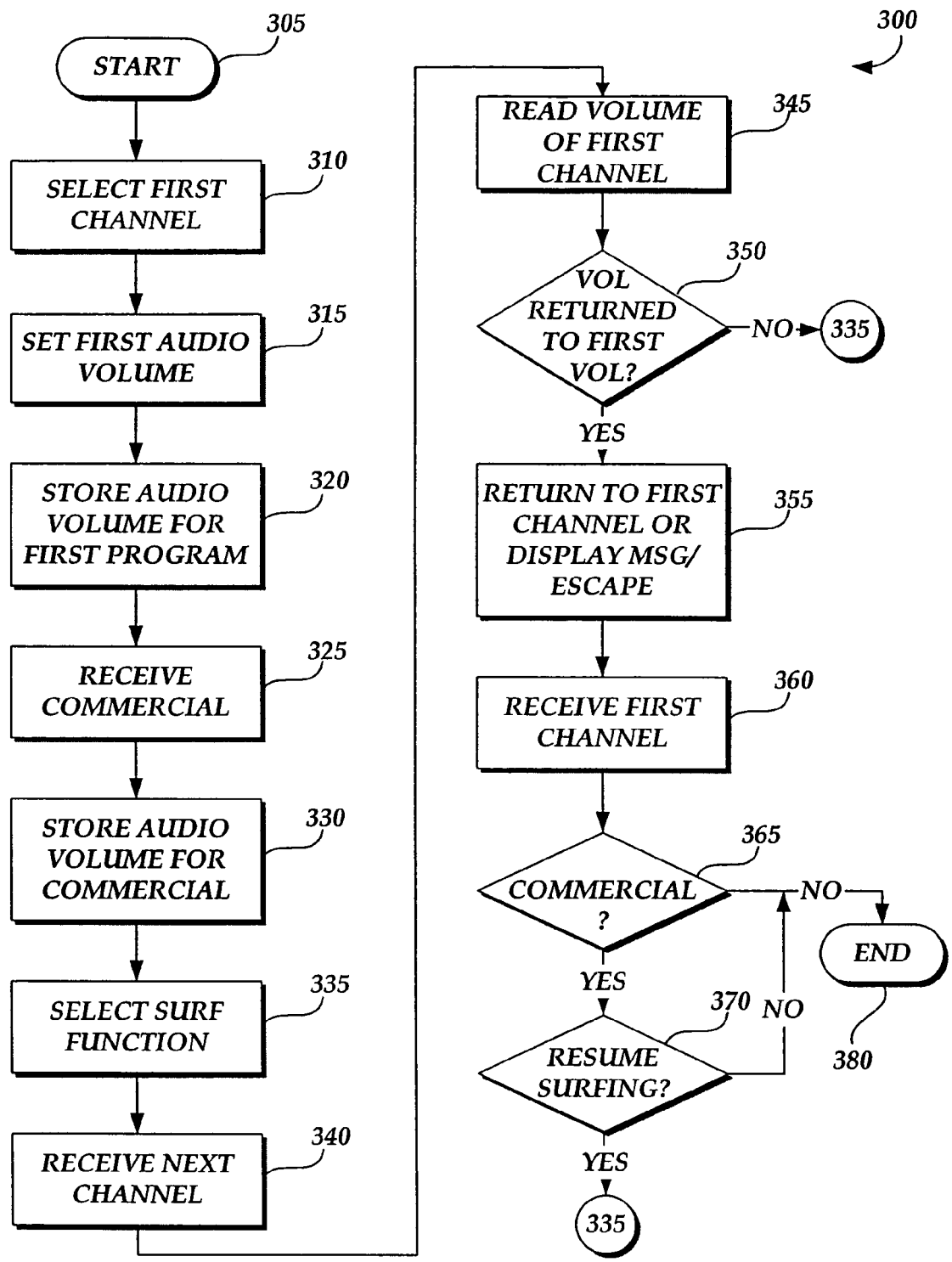
FIG. 3 is a flow diagram illustrating a method for tracking the presentation of a commercial broadcast and for returning a viewer to a desired television program after termination of the commercial broadcast.

Having described an exemplary operating environment and the system architecture of the present invention with reference to FIGS. 1 and 2, FIG. 3 is a flow diagram illustrating a method for tracking the presentation of a commercial broadcast and for returning a viewer to a desired television program after termination of the commercial broadcast. For purposes of description, the method illustrated in FIG. 3 is described with reference to an exemplary channel surfing session initiated by a viewer watching her favorite television show on Channel 5 of her television system 100.

The method 300 begins at start step 305 and proceeds to step 310 where the viewer selects a first channel for viewing her favorite program. According to the present example, the viewer selects Channel 5 on which her favorite program is broadcast during a given time. As described above, the television program to be viewed by the viewer is received via the receiver 110 and tuned to Channel 5 via the tuner control 115. At step 315, the viewer sets the audio volume level for her television program on Channel 5 to a desired and comfortable audio volume level. As should be understood, the viewer may set the volume level by selecting the volume buttons 220, 225 on the user's remote control unit 200, or the user may select volume control buttons or switches on the television system 100. In either case, input from the user is received through the user input device 125 and processed by the processor 120 for adjusting the volume levels of the television. According to a preferred embodiment, at step 320, the processor 120 digitizes the audio volume level set by the viewer on the first channel and stores that information in memory 135.

At step 325, the viewer's favorite program being shown on the first channel is interrupted by receipt of an unwanted or undesirable commercial broadcast. In accordance with the present invention, the commercial broadcast is displayed on the display 140 in place of the user's favorite program. Additionally, in accordance with the present invention, the audio volume level of the commercial broadcast is received and presented to the user at a higher volume than the volume set by the user for the user's favorite program. As step 330, the processor 120 through the volume comparison module 130 detects the higher audio volume level of the commercial broadcast. The audio volume level for the commercial broadcast is digitized and is stored in memory 135.

At step 335, the viewer decides to sample the program offerings of other channels during the commercial broadcast that has interrupted her favorite program on Channel 5. Accordingly, the user selects the Surf Up or Surf Down buttons 240, 245 to begin channel surfing. As described above, the channel surfing functionality of the present invention may be initiated in other ways, including automatic initiation upon selection of the Channel Up or Down buttons 230, 235. According to the present example, the user selects the surf up button 240, and at step 340, the viewer receives the next higher channel, Channel 6 according to the present example.

At step 345, the volume comparison module 130 through the processor 120 reads the present audio volume level of the first channel, Channel 5, according to the present example. The volume comparison module 130 compares the audio volume level of the first channel to the audio volume level originally set by the user to determine whether the audio volume level has returned to the originally set audio volume level. That is, the volume comparison module 130 determines whether the higher audio volume level of the unwanted commercial broadcast has been returned to the audio volume level set by the user at step 315. At step 350, a determination is made as to whether the volume level has returned to the desired volume level. If not, the method proceeds back to step 335, and channel surfing by the viewer continues. Accordingly, the viewer continues to receive the next channel according to the Surf Up or Down buttons 240, 245 selected by the viewer. The volume comparison module 130 continues to monitor the audio volume levels of the first channel broadcasting the user's favorite program during channel surfing by the viewer. As should be understood by those skilled in the art, the volume comparison module 130 may compare the audio volume levels as described at a rate and frequency limited only by the signaling capability of the processor 120 for sending data to the volume comparison module 130.

Returning back to step 350, if the volume of the first channel (Channel 5) has returned from the higher audio volume level of the commercial broadcast to the originally set audio volume level for the user's favorite program, the method proceeds to step 355. At step 355, the volume comparison module 130 instructs the processor 120 via the tuner control 115 to automatically terminate channel surfing and return the user to the user's favorite program on Channel 5. Alternatively, the processor 120 may cause a message 150 to be displayed on display 140 to notify the user that the commercial broadcast is over. After such a notification, the viewer may select the Escape button 260 to terminate surfing and return automatically to the first channel. Or, the user may return to the first channel through other conventional means such as use of the numerical buttons 215 or the channel up or down buttons 230, 235.

Alternatively, the first channel may be reselected or notification may be provided to the user when the present audio level is less than the higher audio volume level detected for the commercial broadcast rather than requiring the audio level to equal the originally set audio level before reselecting the first channel or notifying the user. Accordingly, the user/viewer may see a programming change on the first channel even if it is not the desired program. For example, programming change may include a different commercial broadcast that is of interest to the viewer.

At step 360, the first channel on which the user's favorite program is broadcast is returned to the display 140. At step 365, a determination is made as to whether the viewer's favorite program has indeed returned, or whether a subsequent commercial or other unwanted broadcast has commenced. If not, the method ends at step 380, and the viewer proceeds with viewing her favorite program on the first channel. If a subsequent commercial broadcast or other unwanted broadcast is received upon the viewer's return to the first channel, the method proceeds to step 370, and the viewer may resume channel surfing. As described above, the viewer may resume channel surfing by selecting the channel Surf Up or Down buttons 240, 245. Or, according to one embodiment of the present invention, the viewer may select the Resume button 250 to resume channel surfing at the point at which the user's channel surfing was previously terminated. That is, if the user had previously surfed from Channel 5 through Channel 20, selection of the Resume button 250 will automatically return the user back to Channel 20 so that the user may resume surfing during the period of an unwanted commercial broadcast.

In accordance with the present invention, a method and system are provided for allowing a viewer of a television system 100 to channel surf during the presentation of unwanted commercial broadcasts, as described above. By returning the viewer to the desired television channel after the termination of an unwanted commercial broadcast, the viewer enjoys the ability to sample the program offerings of a variety of different television channels while avoiding missing any of the viewer's favorite program during channel surfing. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method of returning to a first programming channel after conclusion of a second programming broadcast in a television system, comprising:
    receiving a selection of a first channel for viewing a first program;
    receiving a first audio volume level for the first program on the first channel;
    receiving a second program having a second audio volume level on the first channel;
    receiving a selection of a second channel;
    monitoring the present audio volume level of the first channel;
    comparing the present audio volume level of the first channel with the first audio volume level on the first channel; and
    reselecting the first channel when the monitored present audio volume level of the first channel drops to a level associated with the first audio volume level.

2. The method of claim 1, further comprising:
    detecting the first audio volume level and the second audio volume level; and
    storing in memory the first audio volume level and the second audio volume level.

3. The method of claim 1, wherein prior to receiving the selection of the second channel, further comprising beginning channel surfing by receiving a selection of a channel surfing function for receiving a second channel.

4. The method of claim 1, wherein prior to reselecting the first channel, further comprising notifying a user that the second program has ended.

5. The method of claim 4, wherein notifying the user that the second program has ended further comprises displaying a notification message.

6. The method of claim 4, wherein notifying the user that the second program has ended, further comprises:
    automatically reselecting the first channel, and
    displaying the first program.

7. The method of claim 6, further comprising if after automatically reselecting the first channel a third program broadcast is received, resuming channel surfing.

8. The method of claim 7, wherein resuming channel surfing further comprises reselecting a last channel selected by the user during a last channel surfing session.

9. A method of notifying a television viewer of the conclusion of a second programming broadcast in a television system, comprising:
    receiving selection of a first channel for viewing a first program;
    receiving selection of a first audio volume level for the first program;
    receiving on the first channel a second program having a second audio volume level;
    receiving a second channel selection;
    determining the present audio volume level of the first channel;
    comparing the present audio volume level with the first audio volume level; and
    notifying the viewer that the second programming broadcast has concluded when the broadcaster causes the monitored present audio volume level to drop to a level associated with the first audio volume level at the conclusion of the second program.

10. The method of claim 9, wherein notifying the viewer that the second programming broadcast has concluded is performed if the present audio volume level is less than the second audio volume level.

11. The method of claim 9, wherein notifying the viewer that the second programming broadcast has concluded is performed if the present audio volume level is equal to the first audio volume level.

12. The method of claim 9, wherein notifying the viewer that the second programming broadcast has concluded, further comprises displaying a notification message.

13. The method of claim 9, wherein after notifying the viewer that the second programming broadcast has concluded, further comprises:
    automatically reselecting the first channel, and
    displaying the programming presently being broadcast on the first channel.

14. A system for returning to a first programming channel after conclusion of a second programming broadcast in a television system, comprising:
    a tuner control operative:
        to receive a first channel for viewing a first program, the first program having a first audio volume level;
        to receive a second program on the first channel having a second audio volume level; and
        to select a second channel to begin channel surfing;
    a computer processor operative:
        to store the first and second audio volume levels; and
        to monitor a present audio volume level of the first channel; and
    a volume comparison module operative:
        to compare the present audio volume level with the second audio volume level; and
        to cause the computer processor to notify a viewer that the second programming broadcast has concluded when the broadcaster causes the monitored present audio volume level to drop to a level associated with the first audio volume level at the conclusion of the second program.

15. The system of claim 14, wherein the volume comparison module is further operative to notify the viewer that the second programming broadcast has concluded if the present audio volume level is less than the second audio volume level.

16. The system of claim 14, wherein the volume comparison module is further operative to notify the viewer that the second programming broadcast has concluded if the present audio volume level is equal to the first audio volume level.

17. The system of claim 14, wherein the computer processor is further operative to display a notification message that the second programming broadcast has concluded.

18. The system of claim 14, wherein the computer processor is further operative to reselect the first channel after notifying a viewer that the second programming broadcast has concluded, and to display the programming presently being broadcast on the first channel.

19. A method of channel surfing and returning to a first programming channel after conclusion of a commercial broadcast in a television system, comprising:

receiving selection of a first channel for viewing a first program;

receiving selection of a first audio volume level for the first program;

receiving on the first channel a commercial broadcast having a second audio volume level;

beginning channel surfing by receiving selection of a channel surfing function for receiving a second channel selection;

receiving a second channel selection;

monitoring the present audio volume level of the first channel;

comparing the present audio volume level with the first audio volume level; and when the broadcaster causes the monitored present audio volume level to drop to a level associated with the first audio volume level at the conclusion of the commercial broadcast, notifying a viewer that the commercial broadcast has ended, and reselecting the first channel.

20. The method of claim 19, wherein notifying the viewer that the commercial broadcast has ended, further comprises displaying a notification message.

21. The method of claim 20, further comprising if after reselecting the first channel a second commercial broadcast is received, resuming channel surfing.

22. The method of claim 20, wherein resuming channel surfing further comprises reselecting a last channel selected by the user during a last immediate channel surfing session.

23. A computer readable medium having stored thereon computer-executable instructions for causing a computer to perform a method of returning to a first programming channel after conclusion of a second programming broadcast in a television system, the method comprising:

receiving selection of a first channel for viewing a first program;

receiving selection of a first audio volume level for the first program;

receiving on the first channel a second program having a second audio volume level;

receiving a second channel selection;

monitoring the present audio volume level of the first channel;

comparing the present audio volume level with the first audio volume level; and reselecting the first channel when the broadcaster causes the monitored present audio volume level to drop to a level associated with the first audio volume level at the conclusion of the second program.

24. A computer readable medium having stored thereon computer-executable instructions for causing a computer to perform a method of notifying a television viewer of the conclusion of a second programming broadcast in a television system, the method comprising:

receiving selection of a first channel for viewing a first program;

receiving selection of a first audio volume level for the first program;

receiving on the first channel a second program having a second audio volume level;

receiving a second channel selection;

determining the present audio volume level of the first channel;

comparing the present audio volume level with the first audio volume level; and notifying the viewer that the second programming broadcast has concluded when the broadcaster causes the monitored present audio volume level to drop to a level associated with the first audio volume level at the conclusion of the second program.

25. A computer readable medium having stored thereon computer-executable instructions for causing a computer to perform a method of channel surfing and returning to a first programming channel after conclusion of a commercial broadcast in a television system, the method comprising:

receiving selection of a first channel for viewing a first program;

receiving selection of a first audio volume level for the first program;

receiving on the first channel a commercial broadcast having a second audio volume level;

beginning channel surfing by receiving selection of a channel surfing function for receiving a second channel selection;

receiving a second channel selection;

monitoring the present audio volume level of the first channel;

comparing the present audio volume level with the first audio volume level; and when the broadcaster causes the monitored present audio volume level to drop to a level associated with the first audio volume level at the conclusion of the commercial broadcast, notifying a viewer that the commercial broadcast has ended, and reselecting the first channel.

* * * * *